United States Patent [19]

Müller et al.

[11] 4,208,213

[45] Jun. 17, 1980

[54] SHOE CREAM POLISH COMPOSITION

[75] Inventors: Karl-Hans Müller, Bruchköbel; Roland Tailfer, Hanau, both of Fed. Rep. of Germany

[73] Assignee: Deutsche Gold- und Silber-scheideanstalt Vormals Roessler, Frankfurt am Main, Fed. Rep. of Germany

[21] Appl. No.: 847,363

[22] Filed: Oct. 31, 1977

[30] Foreign Application Priority Data

[DE] Fed. Rep. of Germany .....................

[51] Int. Cl.² ............................................... C09F 1/08
[52] U.S. Cl. .......................................... 106/10; 106/2; 106/3; 106/8; 106/11; 106/288 B; 106/288 Q; 260/42.13; 260/42.21

[58] Field of Search ............... 106/3, 8, 288 B, 288 Q, 106/2, 10, 11; 260/42.13, 42.21; 423/337

[56] References Cited

U.S. PATENT DOCUMENTS

| 2,782,124 | 2/1957 | Rosenberg et al. ..................... 106/10 |
| 2,928,857 | 3/1960 | Holt et al. ................................. 106/3 |
| 3,481,768 | 12/1969 | Gowdy ..................................... 106/2 |
| 3,924,029 | 12/1975 | Schutte et al. ......................... 427/213 |

*Primary Examiner*—J. Ziegler
*Attorney, Agent, or Firm*—Beveridge, Degrandi, Kline & Lunsford

[57] ABSTRACT

A shoe cream polish composition which contains in addition to waxes, oils and the like, a finely divided pyrogenic, hydrophobic silicic acid.

7 Claims, No Drawings

SHOE CREAM POLISH COMPOSITION

SUMMARY OF INVENTION

The present invention relates to a shoe cream polish composition which contains, in addition to waxes, oils and the like, from 0.01 to 10% by weight of a finely divided pyrogeneously produced and hydrophobic silica, based on the weight of the shoe cream polish composition.

In a preferred embodiment of the invention, the shoe cream contains a finely divided pyrogeneously produced and hydrophobic silica, which has the following physical and chemical characteristics:

| | | |
|---|---|---|
| Surface area (BET) | $m^2/g$ | $120 \pm 30$ |
| Mean size of the primary particles | millimicron | 16 |
| Bulk weight | | |
| standard | g/l | about 50 |
| more dense form | g/l | about 100 |
| Bulk volume (DIN 53 194) | | |
| standard | ml/100 g | about 2000 |
| more dense form | ml/100 g | about 1000 |
| Loss after drying (DIN 53 198, process A) 2 hours/105° C. | % | 0.5 |
| Loss at red heat (DIN 52 911) 2 hours/1000° C. | % | 2 |
| pH value (DIN 53200) (in 4% aqueous dispersion) | | 3.5–4/1** |
| $SiO_2$* | % | 98.3 |
| $Al_2O_3$* | % | 0.05 |
| $Fe_2O_3$ | % | 0.01 |
| $TiO_2$ | % | 0.03 |
| HCl | % | 0.05 |

*related to the substance dryed for 2 hours at 105° C.
**in water: acetone or methanol 1:1

BACKGROUND OF INVENTION

Obtaining of pyrogenic silica is accomplished, according to known processes, by reaction of volatile compounds of silicon in vapor form at elevated temperatures in the presence of hydrolyzing and possibly also oxidizing substances or mixtures of substances. The production takes place, for example, such that the volatile compounds to be reacted, especially halides of silicon in the gaseous phase, are exposed to the hydrolyzing influence of water vapor (steam) or of these producing gas mixtures, whereby the developing oxide is formed as an aerosol and subsequently is isolated at temperatures above the dew point of the gaseous reaction product, which may be condensed easily. In this case the steam-forming gas mixtures may consist of combustible, particularly hydrogen-containing gas or gases forming said hydrogen, and of non-combustible, perferably oxygen containing gases. Of the compounds to be considered as starting substances, the use of volatile halides, especially of chlorides or fluorides, is particularly advantageous.

For purposes of the present invention, any pyrogenic silica may be used that is capable of being treated and converted into a hydrophobic silica. Various methods are known in the art for producing pyrogenic silica; see for instance U.S. Pat. Nos. 2,871,140; 2,876,119; 2,882,254; 2,892,730; 2,898,391; 2,957,044; 2,990,245; 3,006,738; 3,033,801; 3,083,115; 3,086,851; 3,103,495.

For many purposes it is desirable to impart organophilic or hydrophobic characteristics to fillers, especially for incorporation of highly dispersed fillers into organic media. Thus it has been known to render powdery silica hydrophobic by treatment with suitable organic silicon compounds, for example, alkylchlorosilanes. According to this procedure, the chlorosilane is converted with water and adsorbed on the surface of the silica while forming hydrochloric acid. The hydrophobic silica produced thereby must be subsequently freed from the hydrochloric acid. Representative organic silicon compounds that may be used are dimethyldichlorosilane, ethyltrichlorosilane, amyltrichlorosilane, vinyltrichlorosilane, phenyltrichlorosilane, methyltrichlorosilane, methyldichlorosilane, methylvinyldichlorosilane, trimethylchlorosilane, diphenyldichlorosilane, bis-trichlorosilylethane and bis-trichlorosilylbenzol.

The process of imparting hydrophobic properties to the silica may also be accomplished in the case of powdery silica by treatment with silicon oil to form a coating. For this, the dry powdery, silica must be suspended in an organic liquid. Suitable silicon oils are linear organopolysiloxanes. The free valences not bound to oxygen of the silicon atom may be satisfied by organic groups such as alkyl, aryl or hydrogen. Examples are methyl and $C_6H_5$. The viscosity of these silicon oils is generally between 3 and 1000 cp at 20° C. A specific example of this material is Tegiloxan R 50 which is understood to be a linear dimethylpolysiloxane with a viscosity of 50 cp.

A pyrogenic silica which had been rendered hydrophobic according to the process described in German Pat. No. 11 63 784, corresponding to U.S. Pat. No. 3,924,029 which is relied on and incorporated herein by reference, has proven itself particularly advantageous for use in shoe polish. It should be noted that silica which has been made by a pyrogenic process and treated to render it hydrophobic by processes other than that shown in U.S. Pat. No. 3,924,029 may also be incorporated into shoe polish compositions according to this invention.

According to the process described in the German Pat. No. 11 63 784 and U.S. Pat. No. 3,924,029, pyrogenic silica is subjected to a surface treatment by treatment with an organohalosilane whereby the pyrogenic silica is kept in a whirling suspension. And, after proceeding as far as possible with the liberation of halogen, hydrogen halide and adsorbtively bound water is mixed with organohalosilanes in the absence of oxygen and as homogeneously as possible. This mixture, together with small quantities of steam and optionally together with an inert gas, is continuously fed to an upright, pipe shaped oven forming the processing chamber and is heated to a temperature in the range of about 200° to 800° C., preferably 400° to 600° C. The solid and gaseous reaction products are separated and the solid product may be optionally secondarily de-acidified and dryed, whereby any contact with oxygen prior to cooling down to below 200° C. is to be avoided.

DETAILED DESCRIPTION OF INVENTION

By the term "shoe cream" we intend a salve-like or pasty mixture forming a polish composition of one or more different waxes and paraffins with oil of turpentine, petroleum benzin, white spirits or the like, which may be produced for every color of leather. These shoe cream polish compositions may be applied easily and, after brief polishing with brush or cloth, a hard, water resistant high polish is obtained on the shoe or boot. The solvent content of the shoe cream makes possible a quick cleaning of street dirt and grime, and enables removal of spots and discolorations of all kinds. The shoe cream with its soft wax components, dissolved in the solvent, penetrates into the leather and produces a type of secondary lubrication which is necessary for the retention of the flexibility of the leather. After application, the solvent evaporates and there remains a protective, water repellent layer of wax on the surface of the leather which after polishing, results in a highly lustrous but thin film. Another advantage of the compositions is their temperature stability and the prevention of the exuding of the petroleum solvent (benzin) during deposition of the cream in the leather.

Included among the waxes frequently used in shoe cream recipies are the nature waxes, such as carnauba, candelilla, esparto, beeswax, and schellac waxes; as well as the lignite wax, originating from lignite and its partly synthetic finishing products; furthermore, fully synthetic waxes, such as polyethylene waxes and paraffinic waxes from the FISCHER TROPSCH synthesis. It should be understood that any suitable wax, wax-like substance, or mixtures of any waxes, may be used for purposes of this invention as will be apparent to persons skilled in the art. The choice of which wax to use is a matter well within the scope of the skilled worker.

In addition to the actual waxes which generally have higher melting points; e.g. beyond 100° C., paraffins of various densities may also be used. Slate oils and lignite tar paraffins with melting ranges of 50° and 60° C. are particularly suitable. In addition to the standard paraffins, branched chained paraffins may also be added in order to achieve optimum paste characteristics, as the branched chained paraffins are of particular importance for the control of the crystalline processes.

As a solvent, oil of turpentine is especially useful because of its influence on the crystallization processes during production of the masses of cream. White spirits, petroleum ether or petroleum benzin, may be added to the oil of turpentine. Numerous solvents may be used for purposes of the invention as will be apparent to the skilled worker in this art.

For coloration of the shoe cream, fat-soluble dyes, especially azo dyes and partly also anthraquinone dyes are used. In the case of black shoe creams, nigrosines and indulines may be used. Multi-colored, fat-soluble azo dyes may also be used; for example, the Sudan- and Ceresin dyes which are available in numerous shades. The nigrosines and indulines are not sufficiently soluble as free bases in waxes and solvents. Therefore, they must be modified with fatty or ceric acids, for example eleic, stearic or montanic acid.

The shoe cream compositions may be prepared in double walled stirring tanks which may be heated electrically or with steam and may be cooled with water. In these tanks the waxes and paraffins are melted down at a temperature in the range of 100 to 110° C. and then the fat-soluble dyes are added, preferably predissolved in stearic acid and in a small portion of solvent. For the production of black colored shoe cream compositions, the nigrosine and induline bases are hydrolyzed in oleic acid and are inserted into the hydrolyzed mixture of the waxes; and only at that stage are the ceresins and paraffins added.

After cooling of the melt to about 70° to 80° C., the cold solvents (room temperature) either together or in succession, are allowed to run into the melt while stirring constantly. In this way, the inflow speed is controlled such that the cooling mass passes through a determined time-temperature curve.

As soon as the cooling mass, partly with the help of the outside water cooling, has reached a temperature of 28°-33° C., the mass will be maintained at this temperature with the agitating mechanism turned off. The composition is then ready to be poured into the shoe cream cans for packaging. For this purpose, the composition is heated to the so-called pouring temperature. The precise temperature will depend on the specific formulation. Generally, this temperature is between 38° and 45° C., under which conditions, the composition may be poured into the cans in any convenient manner. The pyrogenic and hydrophobic silica may be added to the shoe cream at any convenient stage of production although it is generally more suitable to add it with the waxes to insure good dispersion.

The shoe cream of the invention is illustrated in the following examples.

EXAMPLE 1

The shoe cream is prepared by heating petroleum benzin or white spirits and melting wax in a container equipped with heating means. Then the remaining additives are added and the mass is homogenized. The composition has the following formulation.

| | |
|---|---|
| Montan wax, bleached | 4% by weight |
| Hoechst wax O | 1.3% by weight |
| Hoechst wax E | 0.7% by weight |
| Hoechst wax S | 1.2% by weight |
| Beeswax, bleached | 3.8% by weight |
| Eresin L 1276 | 0.8% by weight |
| Eresin 11 GS 5355 | 1.3% by weight |
| Paraffin 54/56 | 8.0% by weight |
| Paraffin 50/52 | 5.0% by weight |
| Oil of Turpentine | 33.5% by weight |
| Test benzin (petroleum benzin) | 40.0% by weight |
| Diphenylamine | 0.3% by weight |
| Perfume | 0.1% by weight |

The shoe cream prepared thus, is allowed to cool overnight slowly so that the waxes crystallize. The next day the cream is slowly heated to 50° C. and subsequently poured into cans.

EXAMPLE 2

The shoe cream according to Example 1 is heated to 100° C. until it is entirely liquid. The 1% by weight of the pyrogenic, hydrophobic silica is dispersed with a 20 mm wide dissolver disc for 5 minutes at 500 rpm. The dispersion thus obtained is put back into the oven and is allowed to cool overnight. Then bar-like samples are brought out of the solid mass with a probe, they are divided into two halves and are calcined. From the ash content of these two halves conclusions are drawn as to the settling behavior of the silica.

| Ash Content | Shoe Cream with Pyrogenic & Hydrophobic Silica |
|---|---|
| in the upper half | 1.59–1.48 |
| in the lower half | 1.33–1.34 |

The pyrogenic and hydrophobic silica does not settle but remains homogeneous throughout the shoe cream.

EXAMPLE 3

In order to check the water resistance, the following test is carried out.

The shoe cream of example 1 not containing the pyrogenic and hydrophobic silica is applied to a well smoothed wooden plate and is polished. A drop of water is applied to the well waxed surface is left therefore 20 minutes. Then the water is removed and the surface of the wood is observed. The surface treated with the shoe cream shows a clearly visible "water spot" with protruding wood fibers. Another experiment is run in exactly the same manner but wherein the shoe cream contained pyrogenic and hydrophobic silica. The result was that no water spots were observable on the surface of the polished wooden plate.

The pyrogenic, hydrophobic silica used in examples 2 and 3 (Aerosil R 972) has the following physical-chemical characteristics:

| | | |
|---|---|---|
| Surface area (BET) | $m^2/g$ | $120 \pm 30$ |
| Median size of the primary particles | milli-microns | 16 |
| Bulk weight standard | g/l | about 50 |
| Bulk volume (DIN 53 194) standard | ml/100 g | about 2000 |
| Loss after drying (DIN 53 198, process A) 2 hours 105° C. | % | 0.5 |
| Loss at red heat* (DIN 52 911) (2 hours/1000° C.) | % | 2 |
| pH value (DIN 53200) (in aqueous dispersion) | | 3.5–4.1** |
| SiO hd 3* | % | 98.3 |
| $Al_2O_3$* | % | 0.05 |
| $Fe_2O_3$ | % | 0.01 |
| $TiO_2$ | % | 0.03 |
| HCl | % | 0.05 |

*related to the substance dryed for 2 hours at 105° C.
**in ater: acetone or methanol 1:1

It will be apparent to those skilled in the art that many leather treating compositions such as shoe and boot cream may be prepared using the pyrogenic and hydrophobic silica according to the foregoing description. Hence numerous shoe polishing and treating formulations known in the art may be modified by incorporation therein of the pyrogenic and hydrophobic silica by following the teachings of this invention.

We claim:

1. In a non-aqueous shoe cream polish composition, wherein the improvement comprises the composition containing an amount of a pyrogeneously produced hydrophobic silica effective to provide water resistance to said composition when applied to a surface.

2. In the non-aqueous shoe cream polish composition as set forth in claim 1 wherein said amount is from 0.1 to 10% by weight of the shoe cream.

3. In a non-aqueous shoe cream polish composition as defined in claim 1 wherein said pyrogenic silica is rendered hydrophobic by treatment with an organohalosilane whereby the organohalosilane is hydrolyzed and adsorbed on the surface of said silica while forming hydrogen halide and the resulting hydrophobic silica is then separated from the hydrogen halide, or by coating with a silicon oil.

4. In the non-aqueous shoe cream polish composition as in claim 1 wherein the pyrogenic and hydrophobic silica has the following physical and chemical characteristics.

| | | |
|---|---|---|
| Surface acc. to BET | $m^2/g$ | $120 \pm 30$ |
| Mean size of the primary particles | milli-micron | 16 |
| Bulk weight standard | g/l | about 50 |
| Bulk volume (DIN 53 194) standard | ml/100 g | about 2000 |
| Loss after drying (DIN 53 198, process A) 2 hours/105° C. | % | 0.5 |
| Loss at red heat* (DIN 52 911) (2 hours/1000° C.) | % | 2 |
| pH value (DIN 53200) (in 4% aqueous dispersion) | | 3.5–4.1** |
| $SiO_2$* | % | 98.3 |
| $Al_2O_3$* | % | 0.05 |
| $Fe_2O_3$ | % | 0.01 |
| $TiO_2$ | % | 0.03 |
| HCl | % | 0.05 |

*based on the silica after drying for 2 hours at 105° C.
**in water: acetone or methanol 1:1.

5. In a non-aqueous shoe cream polish composition as in claim 1 wherein the composition comprises a wax selected from the group consisting of natural, synthetic waxes and mixtures thereof, a paraffin selected from the group consisting of straight and branched chain paraffins and a solvent for said wax and said paraffin together with said pyrogeneously produced hydrophobic silica.

6. In a non-aqueous shoe cream polish composition as in claim 5 wherein the composition contains a fat-soluble dye.

7. In a non-aqueous shoe cream polish composition as in claim 6 wherein the dye is a nigrosine or induline modified with a fatty or ceric acid.

* * * * *